United States Patent Office 3,324,944
Patented June 13, 1967

3,324,944
MISCIBLE OIL RECOVERY PROCESS
Fred H. Poettmann, Littleton, Colo., assignor to Marathon Oil Company, Findlay, Ohio, a corporation of Ohio
No Drawing. Filed Apr. 22, 1965, Ser. No. 450,210
6 Claims. (Cl. 166—9)

This invention relates to the recovery of crude petroleum from subterranean formations and more particularly to the displacement of oil of subterranean formations by fluids miscible with the fluids in the formation.

United States Patent 3,163,214 teaches the injection of a mixture of soluble oil and a nonaqueous diluent into an oil-bearing formation to displace hydrocarbon in the formation toward a production well.

In another process of the prior art, water containing soluble oils, sometimes called "transparent emulsions," are utilized to displace oil in a formation. In some instances, water is injected prior to injection of the transparent emulsion to prevent breakdown of the injected transparent emulsion.

The above processes are handicapped by the fact that soluble oils "spontaneously" emulsify water. When sufficient water is taken up, the soluble oils invert to become water-external emulsions. Soluble oils act as though they are miscible with both the hydrocarbons and water in the formation. The crude mixes with the hydrocarbon of the soluble oil, while the water emulsifies into the soluble oil—a phenomenon which causes the soluble oil to act as though miscible with the water. This desired "miscibility" and, therefore, ultimate petroleum recovery is reduced or destroyed by excessive water uptake. This problem is aggravated where the water in the formation contains ions which precipitate the surfactant from solution in the soluble oil. Previously, substantially pure water has been utilized to buffer the soluble oil from the connate water.

While this procedure is helpful, I have now discovered that improved soluble oil stability within a formation can be obtained by injecting a slug of hydrocarbon into the formation prior to injection of the soluble oil. Fresh water protects the soluble oil by the displacement and dilution of ions in the connate water, whereas hydrocarbon injected into the formation prior to injection of the soluble oil protects by building up an oil bank ahead of the soluble oil, even as the soluble oil would. This bank tends to preferentially push oil through the formation but also displaces a portion of the connate water. The displaced connate water is never contacted by the soluble oil and, therefore, does not cause either inversion of the resulting emulsion or precipitation of the soluble oil forming surfactant.

As previously indicated, the process of this invention comprises injecting into a permeable substerranean oil-bearing formation a slug of hydrocarbon and thereafter injecting into the formation a soluble oil. The hydrocarbon and soluble oil can be driven through the formation by a drive material, such as water, "thickened" water, hydrocarbons, etc. Any hydrocarbon which is fluid under formation conditions can be utilized to protect the soluble oil slugs. Preferably, these hydrocarbons have a viscosity about that of the crude in the formation. Thickening materials, such as polyisobutylenes, can be utilized to increase the viscosity of the injected hydrocarbon where the hydrocarbon is of low viscosity. Examples of such low viscosity hydrocarbons include propane, butane, and straight run gasoline.

Soluble oils used in this invention "spontaneously" emulsify water. Use of the term "spontaneously" implies that little mixing energy input is required to establish the forming emulsion. "Soluble oils," for purposes of this application, are intended to include the substantially anhydrous systems wherein the small amount of water contained in the system is introduced as an impurity and the oil-external "transparent emulsions" containing substantial amounts of water. Many systems of both types are known. Surfactants in the soluble oils utilized with a particular formation should be stable to the ions in the connate water and to the ions in the formation rock surfaces.

Generally, the amount of injected hydrocarbon need be only from about 1 to about 30%, and preferably from about 2 to about 5%, of the pore volume of the formation being flooded. The amount of soluble oil injected generally can range from about 2% of the pore volume of the formation being flooded to an amount of soluble oil which renders the recovery process economically unattractive. Preferably, the amount of soluble oil injected ranges from about 3 to about 20% of the pore volume of the formation being flooded.

As previously indicated, any drive material—for example, water-external emulsions, liquefied petroleum gas, water, etc.—can be utilized to displace the previously injected fluids from the formation. Preferably, water containing a polymer or other material which increases its viscosity to desired levels is preferred. Many thickening agents have been described for this purpose. Preferably, a polyacrylamide polymer is utilized. The injected drive fluid can be modulated in viscosity from the viscosity of the soluble oil at the leading edge of the injected drive material to the viscosity of water and, thereafter, water can be utilized to displace the previously injected fluids towards one or more production wells drilled into the formation.

The following examples more fully illustrate this invention; however, it is not intended that the invention be limited to the exact procedure, surfactants, soluble oils, etc., utilized. Rather, it is intended that all equivalents obvious to those skilled in the art be included within the scope of my invention as claimed.

EXAMPLE I

A 4 ft. long by 2 in. diameter Berea sandstone core having a pore volume of 489 cc. and a permeability of 151 md. was saturated with water containing 16,500 p.p.m. sodium chloride. This initial brine was then displaced from the core by Wilkin crude, an 8.3 cp. crude oil, to a residual brine saturation of 0.360 and a crude oil saturation of 0.640. A 16,500 p.p.m. sodium chloride brine was then injected at a constant rate of 10 cc./hr., or approximately 2 ft./day. After a total throughput of 1.0 pore volumes, 40.4% of the oil-in-place was recovered. An extrapolated recovery at a throughput of 1.25 pore volumes is 40.5%.

EXAMPLE II

Another 4 ft. long by 2 in. diameter Berea sandstone core having a pore volume of 466 cc. and a permeability of 140.3 md. was saturated with Stephens-produced water containing about 42,000 p.p.m. total dissolved solids. This initial brine was then displaced from the core by Stephens crude oil, a black, 11 cp. oil at 114° F. to a residual oil saturation of 69.1% and a residual water saturation of 30.9%. The core was then subjected to a secondary recovery operation in which a 10% pore volume soluble oil slug was injected into the core at the rate of 2.147 ft./day. This slug was followed by an infinite bank of thickened water containing 500 p.p.m. of a partially hydrolyzed acrylamide, manufactured by Dow Chemical Company for commercial thickened water flood operations under the name "Pusher"; 1000 p.p.m. sodium chloride; and 50 p.p.m. ammonium thiocyanate. The initially injected soluble oil slug contained 54.54% kerosene, 8.8% of an alkylarylnaphthenic monosulfonate surfactant, 2.44% isopropyl alcohol, and 34.15% water containing 0.709 weight percent sodium sulfate. Recoveries at 1.2 pore volume equal 77.6% crude oil and 13.2% kerosene from the slug for a total hydrocarbon recovery of 72.9%.

EXAMPLE III

A 4 ft. long by 2 in. diameter Berea sandstone core having a pore volume of 430 cc. and a permeability of 98.9 md. was saturated with Stephens-produced water and finally Stephens crude oil to produce a residual brine saturation of 44.7% and oil saturation of 55.3%. A 10% of pore volume slug of kerosene was then injected into the core followed by a soluble oil containing 54.80% kerosene, 8.92% sulfonate, 1.96% isopropanol, and 34.31% water containing 1.235 weight percent sodium sulfate. An infinite slug of thickened water like that of Example II was injected into the core. Recoveries at 1.2 pore volumes injected fluids were 92.5% crude oil and 65.7% kerosene for a total recovery of 86.6%.

Now having described my invention, what I claim is:

1. In a process for the recovery of crude petroleum from oil-bearing formations wherein fluids are injected into the formation through at least one injection well to displace the crude petroleum toward at least one production well, the steps comprising injecting into a subterranean oil-bearing formation a nonpolar organic liquid; thereafter injecting into said formation a soluble oil; and finally injecting into said formation a drive fluid in amounts sufficient to displace the crude petroleum, injected nonpolar organic fluid and soluble oil toward said at least one production well; and recovering crude petroleum therethrough.

2. The process comprising injecting into a subterranean oil-bearing formation through at least one production well drilled therein a hydrocarbon liquid; thereafter injecting into said formation a soluble oil; and finally injecting into said formation a drive fluid in amounts sufficient to displace the crude petroleum, injected hydrocarbon and soluble oil toward at least one production well drilled into said formation; and recovering crude petroleum through said production well.

3. The process for recovering crude petroleum from a subterranean oil-bearing formation comprising injecting into said formation a hydrocarbon liquid in an amount ranging from about 1 to about 30% of the pore volume of the formation being flooded; thereafter injecting into said formation a soluble oil in an amount greater than about 2% of the pore volume of the formation being flooded; and finally injecting into said formation a drive fluid to displace the crude petroleum, injected hydrocarbon and soluble oil toward at least one production well drilled into said formation; and recovering crude oil through said production well.

4. The process of claim 3 wherein the drive fluid is thickened water.

5. The process of claim 3 wherein an amount of hydrocarbon liquid ranging from about 2 to about 5% of the pore volume being flooded is injected into said formation.

6. The process of claim 3 wherein a soluble oil in an amount ranging from about 5 to about 30% of the pore volume of the formation being flooded is injected into said formation.

References Cited

UNITED STATES PATENTS

| | | | |
|---|---|---|---|
| 2,699,306 | 2/1954 | Teter et al. | 166—9 |
| 3,163,214 | 12/1964 | Csaszar | 166—9 |
| 3,261,399 | 7/1966 | Coppel | 166—9 |
| 3,266,570 | 8/1966 | Gogarty | 166—9 |

CHARLES E. O'CONNELL, *Primary Examiner.*

STEPHEN J. NOVOSAD, *Examiner.*

UNITED STATES PATENT OFFICE
CERTIFICATE OF CORRECTION

Patent No. 3,324,944            June 13, 1967

Fred H. Poettmann

It is hereby certified that error appears in the above numbered patent requiring correction and that the said Letters Patent should read as corrected below.

Column 4, line 28, for "2,699,306" read -- 2,669,306 --.

Signed and sealed this 28th day of November 1967.

(SEAL)
Attest:

Edward M. Fletcher, Jr.
Attesting Officer

EDWARD J. BRENNER
Commissioner of Patents